US008548463B2

(12) United States Patent
Vrbaski et al.

(10) Patent No.: US 8,548,463 B2
(45) Date of Patent: Oct. 1, 2013

(54) PCRN ROAMING AGREEMENT

(75) Inventors: Mira Vrbaski, Kanata (CA); Lui Yeung, Kanata (CA); Robert Mann, Carp (CA); Sachin J. Lalseta, Ottawa (CA); Partoo Mohebi-Sarmadi, Ottawa (CA); Haiqing Ma, Nepean (CA); Kalyan Premchand Siddam, Nepean (CA)

(73) Assignee: Alcatel Lucent, Paris (FR)

( * ) Notice: Subject to any disclaimer, the term of this patent is extended or adjusted under 35 U.S.C. 154(b) by 3 days.

(21) Appl. No.: 13/275,686

(22) Filed: Oct. 18, 2011

(65) Prior Publication Data

US 2013/0095826 A1 Apr. 18, 2013

(51) Int. Cl.
*H04W 4/00* (2009.01)
(52) U.S. Cl.
USPC ............... 455/432.3; 455/432.1; 455/433; 455/406; 455/413; 455/415
(58) Field of Classification Search
USPC ............... 455/432.1, 432.3, 433, 406, 413, 455/415, 456.1; 709/228
See application file for complete search history.

(56) References Cited

U.S. PATENT DOCUMENTS

2011/0161504 A1 6/2011 Zhou et al.
2012/0100849 A1* 4/2012 Marsico .................... 455/432.1

FOREIGN PATENT DOCUMENTS

| EP | 1898591 A1 | 3/2008 |
|---|---|---|
| WO | 2010034195 A1 | 4/2010 |
| WO | 2010133239 A1 | 11/2010 |
| WO | 2011020514 A1 | 2/2011 |

OTHER PUBLICATIONS

3GPP TS 29.215 V10.2.0 published Jun. 2011.*
3GPP TS 23.203 V8.3.1 (Sep. 2008) "3rd Generation Partnership Projects; Technical Specification Group Services and System Aspects; Policy and charging control architecture (Release 8)" Sep. 2008 (Retrieved from the Internet:http://www.qui ntil lion.co.jp/3GPP/Specs/23203-83.pdf)• abstract; sections 6.2.1 .0, 6.2. 1.2, 6.2. 1.3, 6.2.4, 6.3, 7.2 •.
3GPP TS 29.213 V8. 12.0 (Sep. 2011)"3rd Generation Partnership Project; Technical Specification Group Core Network and Terninals; Policy and Charging Control signalling flows and Quality of Service (QoS) parameter mapping (Release 8)" Sep. 20 II (Retrieved from the in Internet: http: //www.3gpp.orgiftp/Spec/archive/29_series/29. 213/29.213/29213-8c0.zip) • abstract; sections 4.0, 4.1 , 4.3. 1. 1, 4.3.2.1,5.3; Figure 4.1 .1 •.

(Continued)

*Primary Examiner* — Manpreet Matharu
(74) *Attorney, Agent, or Firm* — Kramer & Amado P.C.

(57) ABSTRACT

Various exemplary embodiments relate to a method performed by a policy and charging rules node (PCRN) for managing a session for a roaming subscriber. The method may include: defining a roaming agreement associated with at least one roaming partner and including at least one limitation; receiving a session establishment request; extracting a subscription identifier; determining an active roaming partner by comparing the subscription identifier to the roaming partner profile; selecting the roaming agreement including the active roaming partner; and enforcing the at least one limitation when processing the session establishment request. The PCRN may include: a roaming agreement storage; a first interface configured to receive a session establishment request for a roaming subscriber; a roaming manager configured to identify a roaming partner associated with the roaming subscriber and a roaming agreement associated with the roaming partner; and a second interface configured to communicate session information with a roaming partner PCRN.

23 Claims, 7 Drawing Sheets

(56) References Cited

OTHER PUBLICATIONS

3GPP TS 29.2 12 V9.3.0 (Jun. 2010) "3rd Generation Partnership Project; Technical Specification Group Core Network and Terminals; Policy and Charging Control over Gx reference point (Release 9)" Jun. 20 10 (Retrieved from the Internet: http: //www.3gpp.orgiftp/Specs/archive/29_series/29.212/29212-930.zip) • entire document•.

3GPP TS 29.215 V l02.0 (Jun. 2011) "3rd Generation Partnership Project; Technical Specification Group Core Network and Terminals; Policy and Charging Control over S9 reference point; Stage 3 (Release 10)" Jun. 20 II (Retrieved from the Internet: http://www.3gpp.org/ftp/Specs/archive/29_series/29.215/29215-a20.zip) • entire document•.

3GPP TS 29.2 14 V9.2.0 (Dec. 2009) "3rd Generation Partnership Project; Technical Specification Group Core Network and Terminals; Policy and Charging Control over Rx reference point (Release 9)"Dec. 2009 (Retrieved from the Internet:http://www.3gpp.org/ftp/Specs/archive/29_series/29.214/29214-920.zip ) • entire document.

* cited by examiner

| Roaming Agreement | |
|---|---|

605 → Roaming Agreement

| Name | Verizon |
|---|---|
| Description | Verizon US network |

610 → Name row
620 → Description row

| 3GPP Network IDs | |
|---|---|
| Mobile Country Code | Mobile Network Code |
| 310 | 004 |
| 310 | 005 |
| 311 | 480 |

630 → 3GPP Network IDs
632 → header row
635a → 310 / 004
635b → 310 / 005
635c → 311 / 480

| Domain Names |
|---|
| verizonwireless |
| www.verizon.com |

640 → Domain Names
645a → verizonwireless
645b → www.verizon.com

| Realms | |
|---|---|
| Primary | hprcn.verizon.net |
| Secondary | pcrn2.verizon.net |
| Secondary | Pcrn3.verizon.net |

650 → Realms
655a → Primary
655b → Secondary pcrn2.verizon.net
655c → Secondary Pcrn3.verizon.net

| Configuration | |
|---|---|
| Release | 9 |
| Vendor | ALU |

660 → Configuration
665 → Release
670 → Vendor

PCRN ROAMING AGREEMENT

TECHNICAL FIELD

Various exemplary embodiments disclosed herein relate generally to communications networks, particularly policy and charging in communications networks.

BACKGROUND

A communications network of a network provider usually has a limited geographical range where it can provide communications services. Network subscribers usually subscribe to a single network. When a network subscriber is outside of the geographical range of the subscribed network, another network provider may provide network service to the subscriber, who is then considered a roaming subscriber. The subscriber's home network and the visited network must negotiate in order to provide network service to the subscriber and correctly apportion the costs of the service.

In view of the foregoing, it would be desirable to provide a network node and method for providing network service to a roaming subscriber. In particular, it would be desirable to provide a network node and method for negotiating the service for the roaming subscriber with the other network.

SUMMARY

In light of the present need for a network node and method for providing network service to a roaming subscriber, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN) for managing a session for a roaming subscriber. The method may include: defining a roaming agreement associated with at least one roaming partner profile, the roaming agreement including at least one limitation on subscribers of a roaming partner; receiving a session establishment request at the PCRN; extracting a subscription identifier from the session establishment request; determining an active roaming partner by comparing the subscription identifier to the at least one roaming partner profile; selecting the roaming agreement including the active roaming partner; and enforcing the at least one limitation of the roaming agreement when processing the session establishment request.

In various alternative embodiments, a roaming partner profile may include a set of 3GPP Networks defined by a Mobile Country Code (MCC) and Mobile Network Code (MNC). In various alternative embodiments a roaming partner profile may include a set of domain names. In various alternative embodiments, a roaming partner profile may include a primary realm that identifies an address of a PCRN of the roaming partner.

In various alternative embodiments, the roaming agreement may be associated with a plurality of roaming partner profiles.

In various alternative embodiments, the step of enforcing the limitation of the roaming agreement may include restricting at least one of a number of sessions with a roaming partner PCRN, a number of subsessions per session with a roaming partner PCRN, and a total number of subsessions with a roaming partner PCRN.

In various alternative embodiments, the method may also include: establishing a session or a subsession with a PCRN of the active roaming partner; and receiving a set of PCC rules from the PCRN of the active roaming partner. The at least one limitation may include a set of accepted PCC rules and the step of enforcing the limitation of the roaming agreement may include validating a received PCC rule only if it is in the set of accepted PCC rules.

In various alternative embodiments, the method may also include: establishing a session or a subsession with a PCRN of the active roaming partner; and receiving a set of QoS rules from the PCRN. The at least one limitation may include a set of accepted QoS rules and the step of enforcing the limitation of the roaming agreement may include validating a received QoS rule only if it is in the set of accepted QoS rules.

Various exemplary embodiments may relate to the above described method encoded as instructions on a non-transitory machine-readable medium. The non-transitory machine-readable medium may include instructions that if executed by a processor of a network node perform the above described method.

Various exemplary embodiments relate to a policy and charging rules node (PCRN). The PCRN may include: a roaming agreement storage configured to store at least one roaming agreement associated with at least one roaming partner; a first interface configured to receive a session establishment request for a roaming subscriber; a roaming manager configured to identify a roaming partner associated with the roaming subscriber and configured to identify a roaming agreement associated with the roaming partner; and a second interface configured to communicate session information with a roaming partner PCRN.

In various alternative embodiments, the at least one roaming agreement may include a session limit that includes at least one of a number of sessions with the roaming partner PCRN, a number of subsessions per session with the roaming partner PCRN, and a total number of subsessions with the roaming partner PCRN. The roaming manager may be further configured to deny the session establishment request if an additional session would exceed the session limit of the selected roaming agreement.

In various alternative embodiments, the at least one roaming agreement may include a set of accepted rules. The PCRN may further comprise a rule validator configured to validate a rule received from the roaming partner PCRN by comparing the received rule with the set of accepted rules. The rule validator may be configured to send the roaming partner PCRN a valid rule from the set of accepted rules if the rule validator determines that the received rule is not valid.

In various alternative embodiments, the roaming partner profile includes a primary realm that identifies an address of a PCRN of the roaming partner.

It should be apparent that, in this manner, various exemplary embodiments enable a network node and method for providing network service to a roaming subscriber. In particular, by including a roaming agreement for a roaming partner at a PCRN, the PCRN may make policy decisions and negotiate the service for the roaming subscriber with the other network.

BRIEF DESCRIPTION OF THE DRAWINGS

In order to better understand various exemplary embodiments, reference is made to the accompanying drawings, wherein.

DETAILED DESCRIPTION

A roaming subscriber poses difficulties for a visited public land mobile network (VPLMN) because the network operator has little information about the subscriber. The VPLMN must make policy decisions for provisioning a session for the roaming subscriber based on the little information it has. The 3GPP specifications direct a VPLMN to communicate with the subscriber's home public land mobile network (HPLMN) to obtain the PCC and/or QoS rules necessary to establish a session for the subscriber. The VPLMN may have a contractual roaming agreement with the HPLMN that determines how to provide the services. The 3GPP specifications, however, are silent as to how a network operator is to manage multiple HPLMNs and provide services according to contractual roaming agreements.

A roaming agreement at a visited PCRN may allow the VPLMN to enforce a contractual roaming agreement when a roaming subscriber seeks to establish a session. The roaming agreement may provide additional information necessary to process a roaming subscriber's session establishment request. The VPLMN may also have concerns about roaming subscribers and wish to enforce policies for roaming subscribers. For example, a VPLMN may wish to conserve network resources used by roaming subscribers by placing limits on roaming subscribers. Additionally, although the HPLMN should provide PCC/QoS rules according to the contractual roaming agreement, a VPLMN may also wish to enforce the contractual roaming agreement when the PCC/QoS rules are received. A roaming agreement at the visited PCRN may provide a VPLMN the ability to make these policy decisions.

Referring now to the drawings, in which like numerals refer to like components or steps, there are disclosed broad aspects of various exemplary embodiments.

Figure 1:
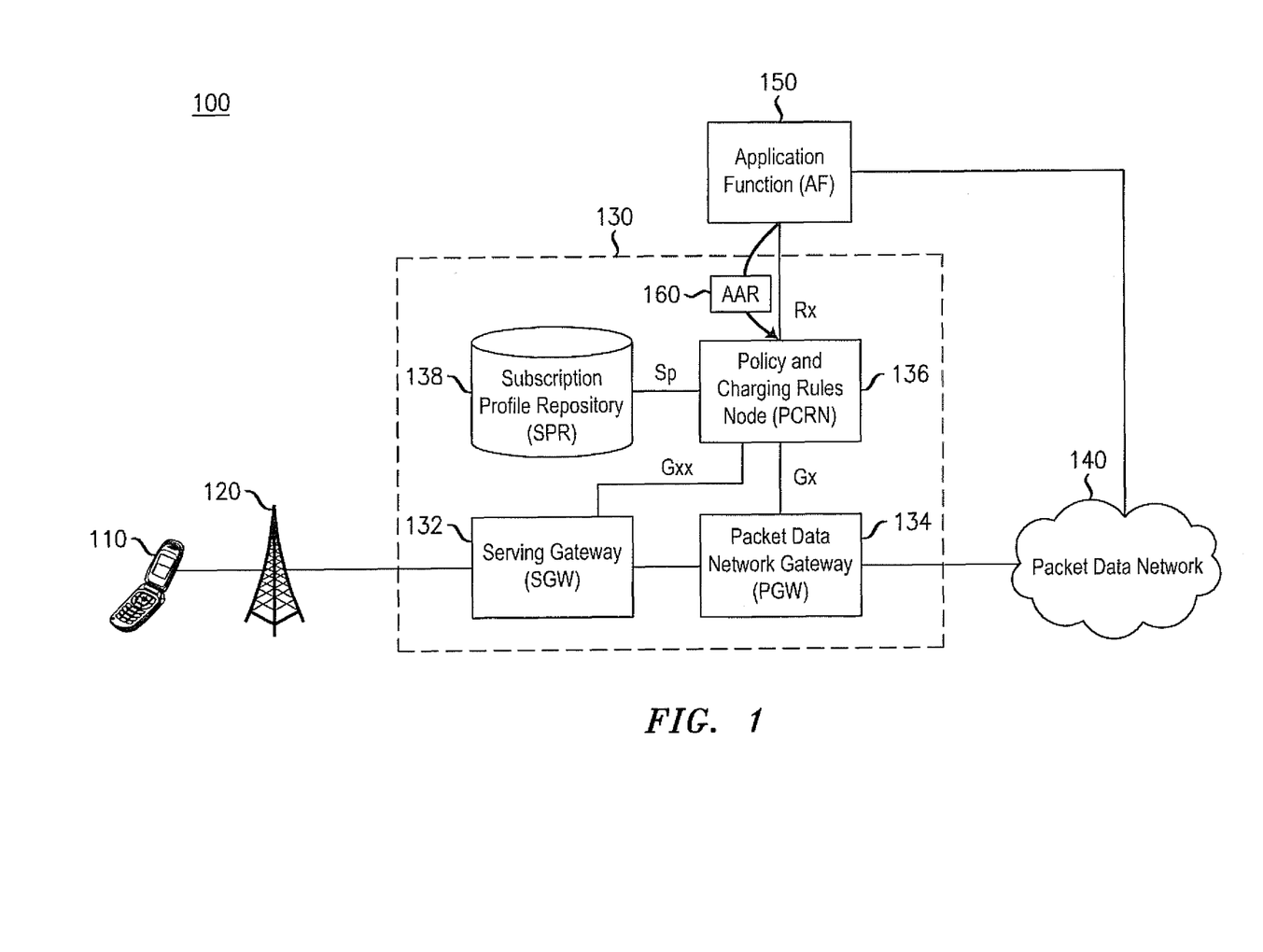
FIG. 1 illustrates an exemplary subscriber network.

FIG. 1 illustrates an exemplary subscriber network 100 for providing various data services. Exemplary subscriber network 100 may be telecommunications network or other network for providing access to various services. In various embodiments, subscriber network 100 may be a public land mobile network (PLMN). Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Figure 2:
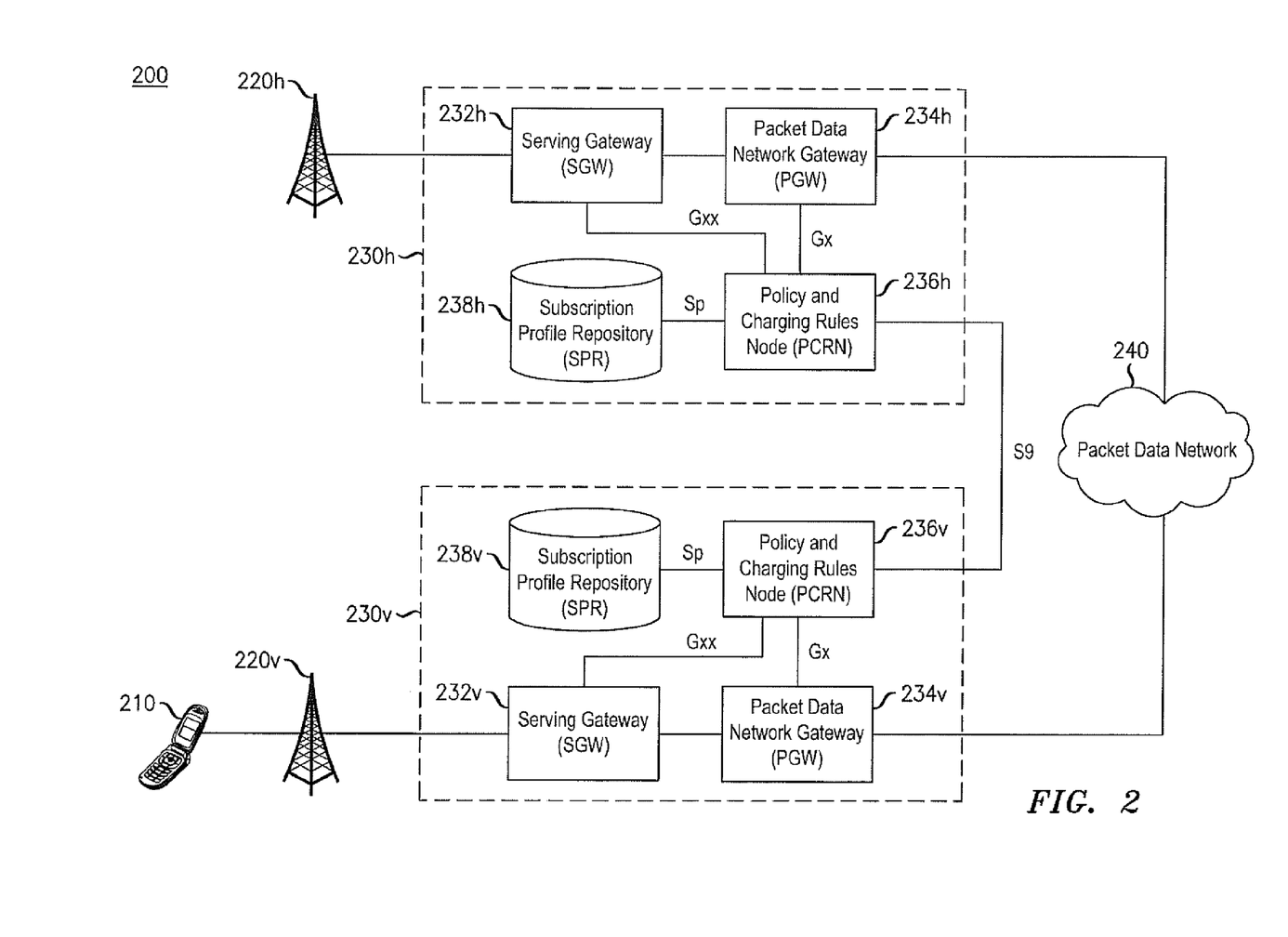
FIG. 2 illustrates an exemplary subscriber network for providing roaming access to various data services.

FIG. 2 illustrates an exemplary subscriber network 200 for providing roaming access to various data services. Exemplary subscriber network 200 may correspond to exemplary network 100. EPC 230v may provide visited access to packet data network 240 for roaming UEs such as UE 210, whereby traffic associated with UE 210 flows through SGW 232v and PGW 234v. Alternatively or additionally, EPC 230v may provide home-routed access to packet data network 240 for roaming UEs such as UE 210, whereby traffic associated with UE 210 flows through SGW 232v and PGW 234h. Accordingly, SGW 232v may be in communication with PGW 234h. Likewise, SGW 232h may be in communication with PGW 234v, such that EPC 230h may provide similar access to other roaming UEs (not shown) attached to base station 220h.

UE 210 may be in communication with a base station 220v but outside the range of base station 220h. Base station 220v, however, may not connect to a home public land mobile network (HPLMN) for the UE 210. Instead, base station 220v may belong to a visited public land mobile network (VPLMN) of the UE 210 and, as such, may not have access to various data associated with the UE 210, a subscriber associated therewith, and/or other data useful or necessary in providing connectivity to UE 210. For example, SPR 238v may not include information associated with UE 210; instead, such information may be stored in SPR 238h. To enable the provision of service based on subscriber information stored in SPR 238h, PCRN 236v may communicate with PCRN 236h via an S9 session.

In various embodiments, PCRN 236v may forward requests associated with UE 210 to PCRN 236h via an S9 session. PCRN 236h may process these messages to, for example, generate PCC and/or QoS rules. PCRN 236h may then forward these rules to PCRN 236v for installation on PGW 234v and/or SGW 232v. In the case of home-routed access, PCRN 236h may also install PCC rules directly on PGW 234h. In view of the cooperative nature of PCRNs 236h, 236v, these devices may be referred to as "partner devices" with respect to each other.

In various embodiments, each partner device may be capable of operating as a home device and a visited device. For example, if another roaming UE (not shown) were attached to base station 220h, PCRN 236h may be additionally capable of forwarding requests to PCRN 236v and PCRN 236v may be capable of returning appropriate rules to PCRN 236h for installation.

Figure 3:
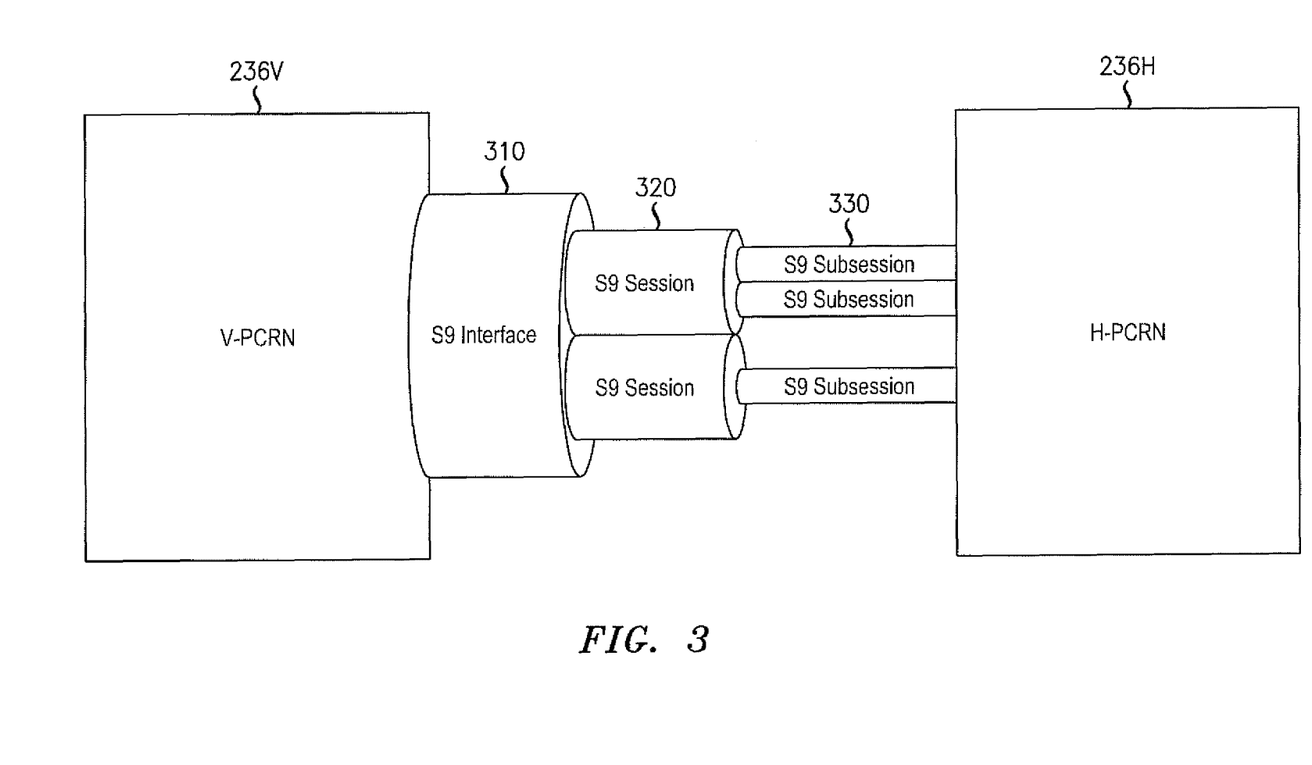
FIG. 3 illustrates an exemplary interface between a visited policy and charging rules node (PCRN) and a home PCRN.

FIG. 3 illustrates an exemplary interface 310 between a visited PCRN 236v and a home PCRN 236h. Interface 310 may be an S9 interface. Interface 310 may be used for communicating session establishment requests, provisioned rules, and other information between a visited PCRN 236v and a home PCRN 236h of a subscriber. Interface 310 may use messages according to the Diameter protocol as described in the 3GPP TS 129.215 specification.

Interface 310 may include zero or more S9 sessions 320. An S9 session 320 may correspond to a roaming subscriber's user equipment. PCRN 236v may establish a new s9 session 320 with PCRN 236h whenever a roaming subscriber's user equipment seeks to establish a connection through EPC 230v. PCRN 236v or PCRN 236h may terminate an s9 session 320 whenever the roaming subscriber disconnects from EPC 230v.

S9 session 320 may include zero or more S9 subsessions 330. An S9 subsession may correspond to an IP-CAN session of a roaming subscriber. An S9 subsession may be created whenever PCRN 236v receives a request for a new IP-CAN or Gateway-Control session. Information may be passed between PCRN 236v and PCRN 236h at the subsession level for the corresponding IP-CAN session. Alternatively, information may be passed at the session level for any IP-CAN session of a subscriber's user equipment. PCRN 236v may monitor the number of S9 sessions and S9 subsessions for each PCRN 236h and/or each roaming partner.

Figure 4:
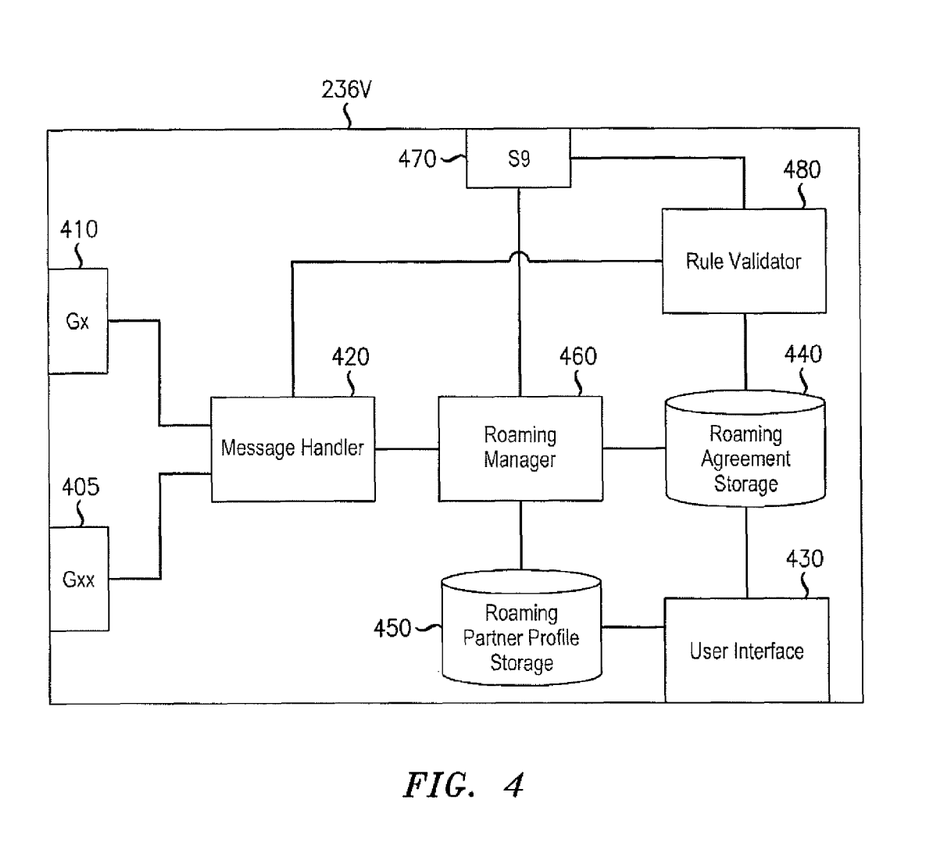
FIG. 4 illustrates an exemplary PCRN for providing service to a roaming subscriber as a visited PCRN.

FIG. 4 illustrates an exemplary visited PCRN 236v for providing service to a roaming subscriber. PCRN 236v may include Gxx interface 405, Gx interface 410, message handler 420, user interface 430, roaming agreement storage 440, roaming partner profile storage 450, roaming manager 460, S9 interface 470, and rules validator 480.

Gxx interface 405 may be an interface comprising hardware and/or executable instructions encoded on a machine-readable storage medium configured to communicate with a SGW such as SGW 232v. Such communication may be implemented according to the 3GPP TS 29.212. Thus, Gxx interface 405 may receive requests for QoS rules and transmit QoS rules for installation. Gxx interface 405 may further receive UE-originated application requests, session requests, and event notifications in the form of a credit control request (CCR).

Gx interface 410 may be an interface comprising hardware and/or executable instructions encoded on a machine-readable storage medium configured to communicate with a PGW such as PGW 234v. Such communication may be implemented according to the 3GPP TS 29.212. Thus, Gx interface 410 may receive requests for PCC rules and transmit PCC rules for installation. Gx interface 410 may further receive UE-originated application requests, session requests, and event notifications in the form of a CCR.

Message handler 420 may include hardware and/or executable instructions on a machine-readable storage medium configured to process rule requests sent and/or received via Gxx interface 405 and/or Gx interface 410. For example, message handler 420 may receive a rule request from PGW 234v for a roaming subscriber. After PCRN 236v makes a policy decision, message handler 420 may construct and transmit a message over Gxx interface 405 and/or Gx interface 410 to notify other nodes as to the result of the policy decision. For example, if node 136 creates a new PCC rule according to an applicable policy, it may construct a reauthorization request (RAR) message to push the new PCC rule to an appropriate PGW.

User interface 430 may include hardware and/or executable instructions on a machine-readable storage medium configured to provide a network operator with access to PCRN 236v. User interface 430 may receive input from a network operator and may include hardware such as, for example, a keyboard and/or mouse. User interface 430 may also display information as output to the network operator and may include, for example, a monitor. A network operator may access roaming agreement storage 440 and/or roaming partner profile storage 450 via user interface 430. User interface 430 may provide a network operator with various options for creating roaming agreements and roaming partner profiles.

Roaming agreement storage 440 may include any machine-readable medium capable of storing roaming agreements for use by PCRN 236v. Accordingly, roaming agreement storage 440 may include a machine-readable storage medium such as read-only memory (ROM), random-access memory (RAM), magnetic disk storage media, optical storage media, flash-memory devices, and/or similar storage media. As will be described in further detail below with respect to FIG. 5, roaming agreement storage 440 may store definitions of numerous roaming agreements. Roaming agreement storage 440 may include a cache for storing roaming agreements that are used frequently.

Roaming partner profile storage 450 may include any machine-readable medium capable of storing roaming agreements for use by PCRN 236v. Accordingly, roaming partner profile storage 450 may include a machine-readable storage medium such as read-only memory (ROM), random-access memory (RAM), magnetic disk storage media, optical storage media, flash-memory devices, and/or similar storage media. As will be described in further detail below with respect to FIG. 6, roaming partner profile storage 450 may store definitions of numerous roaming agreements. Roaming partner profile storage 450 may include a cache for storing roaming agreements that are used frequently.

Roaming manager 460 may include hardware and/or executable instructions on a machine-readable storage medium configured to process requests for service for a roaming subscriber. Roaming manager 460 may receive a request in the form of a CCR message received via Gx interface 405 or Gxx interface 410. Roaming manager 460 may determine whether the request is for a roaming subscriber whose HPLMN has made a contractual roaming agreement with the VPLMN. Accordingly, roaming manager 460 may extract one or more subscription IDs from the request for service. Roaming manager 460 may compare the extracted subscription IDs with various network identifiers stored in the roaming partner profile storage 450. Roaming manager 460 may also determine an applicable roaming agreement by accessing roaming agreement storage 440. If a particular roaming partner has too many subscribers using the visited network or too many sessions according to the roaming agreement, roaming manager 460 may refuse to provide service to additional roaming subscribers. Roaming manager 460 may use information stored in roaming agreement storage 440 and roaming partner profile storage 450 to establish a communication session with a home PCRN, such as PCRN 236h, of the subscriber over S9 interface 470. Roaming manager 460 may forward any information included in the service request to the home PCRN via the S9 interface. A more detailed description of an exemplary method including steps performed by roaming manager 460 will be provided below with respect to FIG. 7.

S9 interface 470 may be an interface comprising hardware and/or executable instructions encoded on a machine-readable storage medium configured to communicate with another PCRN such as PCRN 236h. Such communication may be implemented according to the 3GPP TS 29.215. Thus, S9 interface 470 may forward requests for PCC/QoS rules to a partner device and receive PCC/QoS rules from a partner device for installation in the VPLMN. S9 interface 470 may include an S9 session for each roaming UE connected to the VPLMN. The partner devices may use the established S9 session for monitoring and updating the subscriber's connection while the UE is attached to the VPLMN. As described above regarding FIG. 3, an S9 session may include multiple S9 subsessions the user equipment of a roaming subscriber uses more than one IP-CAN session.

Rule validator 480 may include hardware and/or executable instructions on a machine-readable storage medium configured to process PCC/QoS rules received from a partner device. Rule validator 480 may process PCC/QoS rules received via S9 interface 470. Rule validator 480 may determine the roaming partner that sent the PCC/QoS rules. Rule validator 480 may access roaming agreement storage 440 to determine whether the received rules are allowed under the roaming agreement. Accordingly, rule validator 480 may compare the received rules with a set of rules in the roaming agreement. If the received rules are allowed according to the roaming agreement, rule validator 480 may forward the rules to message handler 420 for installation. If the received rules are not valid, rule validator 480 may determine a PCC/QoS rule that would be valid and include the valid rule in a response sent via the S9 interface 470. A more detailed description of an exemplary method including steps performed by rule validator 480 will be provided below with respect to FIG. 7.

Figure 5:
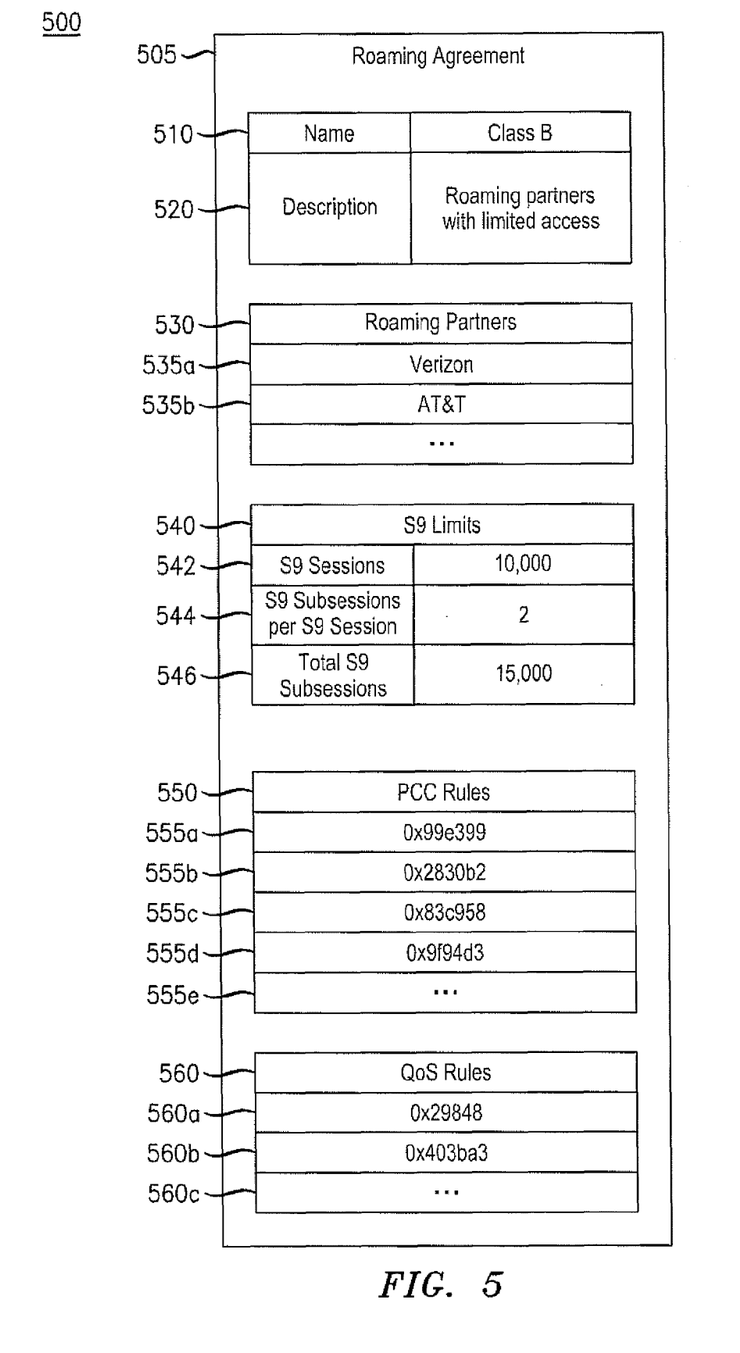
FIG. 5 illustrates an exemplary data structure for storing a roaming agreement.

FIG. 5 illustrates an exemplary data structure 500 for storing an exemplary roaming agreement 505. It should be apparent that data structure 500 may be implemented using a variety of data structures such as, for example, objects, arrays, linked lists, or trees. Data structure 500 may be stored in roaming agreement storage 435 or another computer-readable storage medium accessible to PCRN 236v. Exemplary roaming agreement 505 may be one possible roaming agreement used by PCRN 236v. Roaming agreement 505 may be configured by a network operator using user interface 430 or may be imported from a computer-readable storage medium or other source. It should be apparent that PCRN 236v may use multiple roaming agreements and roaming agreements may vary greatly.

Roaming agreement 505 may be a roaming agreement that includes information about how PCRN 236v should manage sessions for roaming subscribers. Roaming agreement 505 may include multiple fields including name 510, description 520, set of roaming partners 530, S9 limits 540, set of PCC rules 550, and set of QoS rules 560.

Name 510 may indicate a unique name for the roaming agreement. Name 510 may be used to identify the particular roaming agreement. Name 510 may be set by a network operator configuring the roaming agreement. Exemplary roaming agreement 505 may be named "Class B" as indicated by name 510. Description 520 may include a textual description of the roaming agreement. Description 520 may provide a network operator or other person viewing roaming agreement 505 with an explanation of the roaming agreement. For example, description 520 may indicate that exemplary roaming agreement 505 is for roaming partners with limited access.

Figure 6:
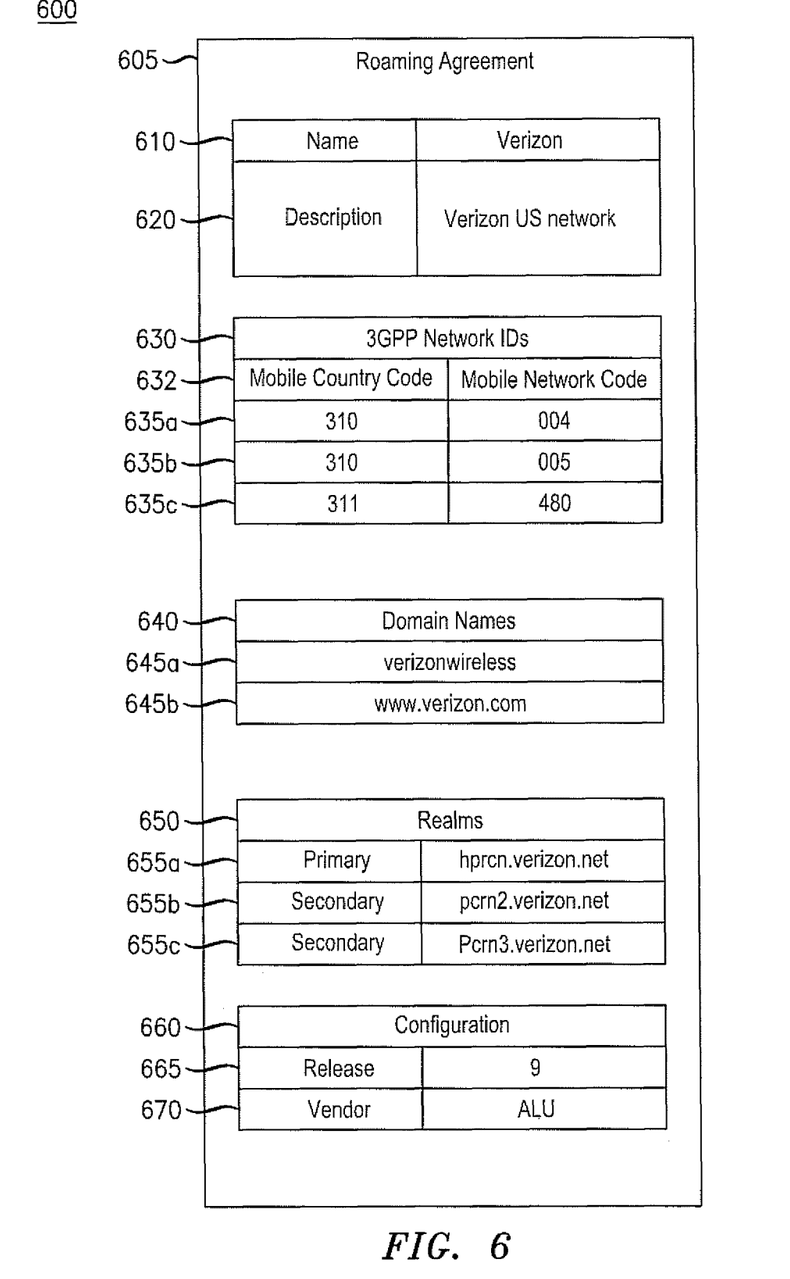
FIG. 6 illustrates an exemplary data structure for storing a roaming partner.

The set of roaming partners 530 may include an entry 535 for each HPLMN that has agreed to the roaming agreement with the VPLMN of PCRN 236v. Data structure 600, which will be described below, may be used for storing information about a roaming partner. The set of roaming partners 530 may include a direct or indirect reference to a data structure 600 or may include the data structure itself in entry 535. For simplicity, only the name of the roaming partner is shown in FIG. 5. As examples of roaming partners, the entries 535 may include Verizon 535a and AT&T 535b. Entry 535c may indicate that additional roaming partners may be included.

S9 limits 540 may include limits on the number of sessions that may be established by roaming subscribers of other service providers. S9 limits 540 may include a number of S9 sessions 540, a number of S9 subsessions per S9 session 544, and a number of total S9 sessions 546. The number of S9 limits 540 may be measured on a per roaming partner or a per roaming agreement basis. A subscriber agreement 505 may set one or more S9 limits or allow an unlimited number of S9 sessions and/or subsessions. Exemplary S9 limits 540 have been provided in FIG. 5. For example, S9 sessions 542 may indicate that 10,000 subscribers of a roaming partner are allowed to establish a roaming connection via PCRN 236v. As another example, S9 subsessions per S9 session 544 may indicate that each roaming user equipment device is allowed to have 2 S9 subsessions, that is, 2 IP-CAN sessions for the roaming connection. As another example, total S9 subsessions 546 may indicate that subscribers for the roaming partner may establish 15,000 S9 subsessions, that is, 15,000 IP-CAN sessions.

The set of PCC rules 550 may indicate PCC rules that are allowed for roaming subscribers according to the roaming agreement. The set of PCC rules 550 may be compared to PCC rules received from the home PCRN 236h of the roaming subscriber. The set of PCC rules 550 may also be used to provide a valid PCC rule if the received PCC rules are not on the list. The set of PCC rules 550 may include an entry 555 for each PCC rule. An entry 555 may include the rule name for each PCC rule. Alternatively, an entry 555 may include other parts of the PCC rule or the entire PCC rule. Entries 555a-d may include exemplary PCC rule names. Entry 555e may indicate that additional PCC rules may be included in the set of PCC rules 550.

The set of QoS rules 560 may indicate QoS rules that are allowed for roaming subscribers according to the roaming agreement. The set of QoS rules 560 may be compared to QoS rules received from the home PCRN 236h of the roaming subscriber. Alternatively, the set of QoS rules 560 may be compared to QoS rules derived from received PCC rules. The set of QoS rules 560 may also be used to provide a valid QoS rule if the received QoS rules are not on the list. The set of QoS rules 560 may include an entry 565 for each QoS rule. An entry 565 may include the rule name for each QoS rule. Alternatively, an entry 565 may include other parts of the QoS rule or the entire QoS rule. Entries 565a and 565b may include exemplary QoS rule names. Entry 565c may indicate that additional QoS rules may be included in the set of QoS rules 560.

FIG. 6 illustrates an exemplary data structure 600 for storing information about an exemplary roaming partner profile 605. It should be apparent that data structure 600 may be implemented using a variety of data structures such as, for example, objects, arrays, linked lists, or trees. Data structure 600 may be stored in roaming agreement storage 440 or another computer-readable storage medium accessible to PCRN 236v.

Exemplary roaming partner profile 605 may be one possible roaming partner used by PCRN 236v or PCRN 236h. Roaming partner profile 605 may be configured by a network operator using user interface 430 or may be imported from a computer-readable storage medium or other source. It should be apparent that PCRN 236v may use multiple roaming partner profiles. PCRN 236v may include one roaming partner profile for each other HPLMN that has made a roaming agreement with the VPLMN. Roaming partner profile 605 may include multiple fields including name 610, description 620, set of 3GPP Network IDs 630, set of domain names 640, set of realms 650, configuration information 660.

Name 610 may indicate a unique name for the roaming partner profile. Name 610 may be used to identify the particular roaming partner. Name 610 may be set by a network operator configuring the roaming partner profile. Exemplary roaming partner profile 605 may be named "Verizon" as indicated by name 610. Description 620 may include a textual description of the roaming partner. Description 620 may provide a network operator or other person viewing roaming partner profile 605 with an explanation of the roaming partner. For example, description 620 may indicate that exemplary roaming partner profile 605 is for Verizon's US network.

The set of 3GPP Network IDs 630 may include a set of network IDs used by the roaming partner. A 3GPP network ID may be part of an IMSI number used to identify a subscriber. A 3GPP network ID may include a Mobile Country Code (MCC) 632 and a Mobile Network Code (MNC) 634. A roaming partner may use multiple MCCs and multiple MNCs within the same country. The set of 3GPP Network IDs 630 may include entries 635. Each entry 635 may include a MCC/MNC pair. Exemplary roaming partner profile 605 may include three entries 635a-c. Exemplary entry 635a may indicate the roaming partner uses an MCC/MNC combination "310/004". Exemplary entry 635b may indicate the roaming partner uses an MCC/MNC combination "310/005". Exemplary entry 635c may indicate the roaming partner uses an MCC/MNC combination "311/480". Additional entries 635 may be included for other MCC/MNC combinations.

The set of domain names 640 may include a set of domain names used by the roaming partner. A domain name may be used by a roaming partner as part of a Network Access Identifier (NAI) used to identify a subscriber. The set of domain names 640 may include any domain name or variation of spelling used by the roaming partner. Exemplary roaming partner profile 605 may include two entries 645a and 645b. Exemplary entry 645 a may indicate that the roaming partner uses "verizonwireless" as a domain name. Exemplary entry 645b may indicate that the roaming partner uses "www.verizon.com" as a domain name. Additional entries 645 may be included for additional domain names and/or alternative spellings.

The set of realms 650 may include a set of origin realms used by the roaming partner. The realm may provide an address to be used for communicating with the roaming partner. A realm may be a fully qualified domain name (FQDN) that unambiguously designates a PCRN of the roaming partner. A realm may be a primary realm or a secondary realm. The primary realm may indicate a PCRN that the roaming partner has indicated should receive all requests for roaming subscribers. Secondary realms may indicate a PCRN that may act as visited PCRNs and send requests to PCRN 236h when it acts as a home PCRN. Exemplary set of realms 650 may include exemplary entries 655a-c. Exemplary entry 655a may indicate that the roaming partner uses "hprcn.verizon.net" as the primary realm for receiving requests for roaming sessions. Exemplary entry 655b may indicate that the roaming partner uses "pern2.verizon.net" as a secondary realm. Exemplary entry 655b may indicate that the roaming partner uses "pern3.verizon.net" as a secondary realm.

Configuration information 660 may indicate other useful information about the roaming partner. For example, release 662 may indicate a specification version number that the roaming partner supports. This information may be used to ensure compatibility. As another example, vendor 664 may indicate a vendor of equipment such as the PCRN used by the roaming provider.

Figure 7:
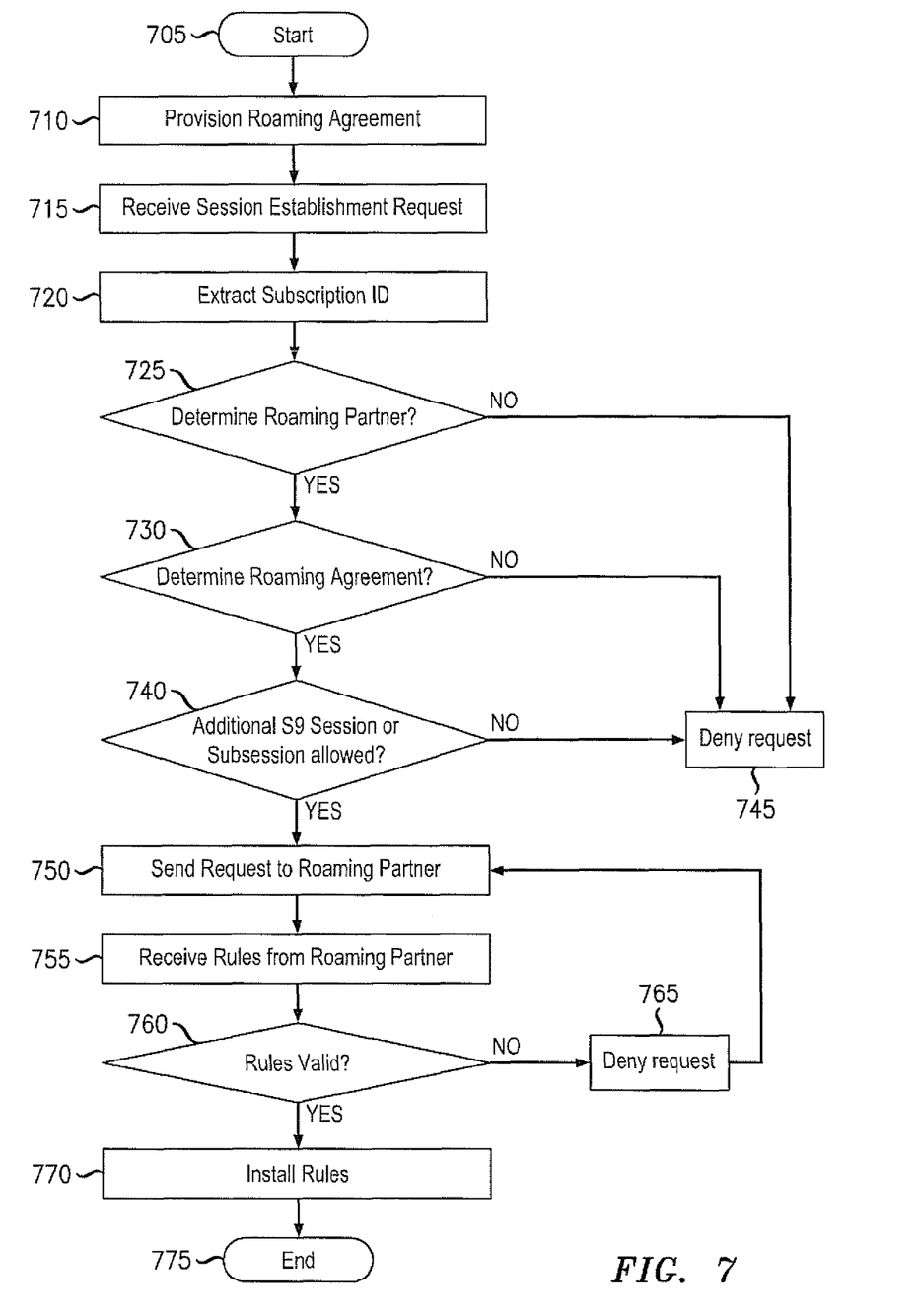
FIG. 7 illustrates a flowchart showing an exemplary method of managing a connection for a roaming subscriber.

FIG. 7 illustrates a flowchart showing an exemplary method 700 of managing a connection for a roaming subscriber. The method 700 may be performed by the various components of visited PCRN 236v such as message handler 420, roaming manager 460, and rules validator 480. The method 700 may begin in step 705 and proceed to step 710.

In step 710, a network operator may use user interface 430 to configure a roaming agreement. The network operator may select the roaming partners that are subject to the roaming agreement. The network operator may use the user interface 430 to generate a roaming partner profile. The roaming partner profile may be stored in roaming partner profile storage 450. The network operator may base the roaming agreement used by PCRN 236v on a contractual roaming agreement between service providers. The network operator may also set S9 limits or allow an unlimited number of S9 sessions or subsessions. The network operator may also select a set of PCC and/or QoS rules that are allowed by the roaming agreement. The roaming agreement may be stored in roaming agreement storage 440. Once the network operator has provisioned at least one roaming agreement, the method may proceed to step 715.

In step 715, the PCRN 236v may receive a session establishment request from a PGW such as PGW 234 via Gx interface 405 or an SGW such as SGW 232 via Gxx interface 410. The request may seek to establish an IP-CAN session for a roaming subscriber, that is, a subscriber who does not subscribe to the VPLMN. The method may then proceed to step 715.

In step 720, the roaming manager 460 may extract one or more subscription IDs from the received session establishment request. The subscription IDs may be contained in a subscription-ID AVP of the session establishment request. The roaming manager 460 may extract different types of IDs from the subscription IDs. For example, if the network uses CDMA technology, the roaming manager may extract a network access identifier (NAI) from the subscription ID. As another example, if the network is 3GPP complaint, the roaming manager 460 may extract a 3GPP identifier in the form of an international mobile subscriber identifier (IMSI). The roaming manager may extract a network identifier that identifies the subscriber's HPLMN from part of the subscription identifier. For example, if the subscription ID is an NAI, the roaming manager 460 may use the domain name to identify the roaming partner. If the subscription ID is an IMSI, the roaming manager 460 may use the MCC/MNC combination at the beginning of the IMSI. The method may then proceed to step 725.

In step 725, the roaming manager 460 may determine the roaming partner to which the UE subscribes. The roaming manger 460 may compare the network identifier with the configured network identifiers in each roaming partner profile stored in roaming partner profile 450. For example, roaming manager 460 may compare an MCC/MNC combination with the set of 3GPP network IDs 630. Alternatively, roaming manger 460 may check roaming agreement storage 440 to determine whether any of the roaming agreements include a roaming partner matching the network identifier. If no matching roaming partner is found, PCRN 236v may deny the session establishment request in step 745. Once a matching roaming partner is found, the method may proceed to step 730, where the roaming manager may determine the applicable roaming agreement. The roaming manager 460 may search roaming agreement storage 440 for a roaming agreement including the roaming partner. If no roaming agreement is found, PCRN 236v may deny the session establishment request in step 745.

In step 740, the roaming manager 460 may determine whether a new S9 session is allowed for the roaming partner according to the roaming agreement. The roaming manager 460 may determine the current number of S9 sessions and subsessions for the roaming partner. If the new session establishment request would cause the number of S9 sessions to exceed the number allowed by the roaming agreement, the method 700 may proceed to step 745, where PCRN 236v may deny the session establishment request. Likewise, if a new subsession created by the session establishment request would exceed the number of subsessions allowed per subscriber, or the total number of subsessions, the method 700 may proceed to step 745, where PCRN 236v may deny the session establishment request. If the new session would not exceed any S9 limit, the method may proceed to step 750.

In step 750, PCRN 236v may forward the session establishment request to the roaming partner identified in step 725. PCRN 236v may use the S9 interface to forward the session establishment request. If the request is for a new session for the UE 210, PCRN 236v may establish a new S9 session with the partner device, such as PCRN 236h. If the request is for an additional IP-CAN session for UE 210, PCRN 236v may establish an additional S9 subsession with the partner device. The method may then proceed to step 755.

In step 755, the PCRN 236v may receive a set of PCC and/or QoS rules from the partner device. The PCC and/or QoS rules may have been generated by the partner device according to rules defined at the partner device. PCRN 236v may receive the rules in an S9 session and or subsession. The received rules may be passed to rule validator 480, and the method 700 may proceed to step 760.

In step 760, the rules validator 480 may determine whether the rules received from the partner device are allowed under the roaming agreement. The rules validator 480 may compare any received PCC rules to the set of PCC rules included in the set of PCC rules 550 of the roaming agreement. If a received PCC rule does not match one of the listed PCC rules, the method may proceed to step 765. The rules validator 480 may also compare any received QoS rules with the set of QoS rules 560. If a received QoS rule does not match one of the listed QoS rules, the method may proceed to step 765. The rule validator may also compare a PCC rule with the set of QoS rules 560 by extracting the QoS information from the PCC rule and using the QoS information to generate a QoS rule. If all of the included PCC and/or QoS rules are valid, the method may proceed to step 770.

In step 765, PCRN 236v may send the partner device a message indicating that the PCC and/or QoS rules were denied. PCRN 236v may include one or more suggested PCC and/or QoS rules based on the PCC/QoS rules defined in the roaming agreement. The method 700 may then return to step 750, where PCRN 236v may wait for a new set of PCC and/or QoS rules from the partner device. If the partner device does not provide an acceptable set of PCC and/or QoS rules, PCRN 236v may deny the session establishment request.

In step 770, PCRN 236v may install the accepted PCC and/or QoS rules in the VPLMN. Message handler 420 may send appropriate messages to SGW 232v and/or PGW 234v. Once the other network nodes have installed the PCC and/or QoS rules, the UE 220 may have access to the subscriber network 200 as a roaming subscriber. PGW 234v and/or SGW 232v may monitor the established session and send messages to PCRN 236v, which may forward the messages to PCRN 236h via the established sessions of the S9 interface. The method may then proceed to step 775, where the method ends.

Having described the various components of PCRN 236v and an exemplary method performed by PCRN 236v, an example of a session establishment for a roaming subscriber will not be provided. The roaming subscriber may attempt to use UE 210 to connect to network 200. The roaming subscriber may have a subscription with a HPLMN such as, for example, Verizon, but not be within range of any Verizon base station 220h. Therefore, UE 210 may seek to establish a connection with the closest base station 220v, which may belong to a VPLMN. The VPLMN may have a contractual roaming agreement with Verizon and have defined a roaming agreement 505 and roaming partner profile 605 for Verizon at the visited PCRN 236v. The subscriber may have an IMSI of 310004123456789.

The UE 210 may initiate a session establishment request through SGW 232v or PGW 234v, which may forward the request to PCRN 236v. When PCRN 236v receives the session establishment request, it may extract the IMSI from a subscription-ID AVP of the session establishment request. PCRN 236v may then use the first six digits of the IMSI as an MCC/MNC combination. PCRN 236v may compare "310/004" to each of the network identifiers in each roaming partner profile. In this example, the MCC/MNC combination matches entry 635a in Verizon's roaming partner profile. PCRN 236v may then identify roaming agreement 505 because it includes Verizon in entry 535a.

PCRN 236v may enforce roaming agreement 535a. If the requested session would cause Verizon to exceed an S9 limit 540, PCRN 236v may deny the request. For example, if 10,000 Verizon customers are already roaming on the VPLMN, PCRN 236v may deny the request according to entry 542.

PCRN 236v may also request PCC/QoS rules from home PCRN 236h by establishing an S9 session with the primary realm 655a of Verizon, hpern.verizon.net. PCRN 236v may also enforce the roaming agreement when it receives PCC/QoS rules from PCRN 236h. For example, if PCRN 236h sends a PCC rule "0x498cb3", PCRN 236v may not validate the rule because it is not included in the set of PCC rules 550. Instead, PCRN 236v may include, for example, rule "0x2830b2" as an allowed rule in a CCR message denying the PCC rule. Once PCRN 236v receives a valid set of rules, it may install the rules in the VPLMN and UE 210 may be able to use the network.

According to the foregoing, various exemplary embodiments provide for a network node and method for providing network service to a roaming subscriber. In particular, by including a roaming agreement for a roaming partner at a PCRN, the PCRN may make policy decisions and negotiate the service for the roaming subscriber with the other network.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for managing a session for a roaming subscriber, the method comprising:

defining a roaming agreement associated with at least one roaming partner profile, the roaming agreement including at least one limitation on an S9 session between the PCRN and the roaming partner;

receiving a session establishment request at the PCRN;

extracting a subscription identifier from the session establishment request;

determining an active roaming partner by comparing the subscription identifier to the at least one roaming partner profile;

selecting the roaming agreement including the active roaming partner; and enforcing the at least one limitation of the roaming agreement when processing the session establishment request.

2. The method of claim 1, wherein a roaming partner profile includes a set of 3GPP Networks defined by a Mobile Country Code (MCC) and Mobile Network Code (MNC).

3. The method of claim 1, wherein a roaming partner profile includes a set of domain names.

4. The method of claim 1, wherein the roaming agreement is associated with a plurality of roaming partner profiles.

5. The method of claim 1, wherein the step of enforcing the limitation of the roaming agreement comprises restricting at least one of: a number of sessions with a roaming partner PCRN, a number of subsessions per session with a roaming partner PCRN, and a total number of subsessions with a roaming partner PCRN.

6. The method of claim 1, further comprising:

establishing a session or a subsession with a PCRN of the active roaming partner; and receiving a set of PCC rules from the PCRN of the active roaming partner.

7. The method of claim 6, wherein the roaming agreement further includes a set of accepted PCC rules and the method further comprises validating a received PCC rule only if it is in the set of accepted PCC rules.

8. The method of claim 1, further comprising:

establishing a session or a subsession with a PCRN of the active roaming partner; and receiving a set of QoS rules from the PCRN.

9. The method of claim 8, wherein the roaming agreement further includes a set of accepted QoS rules and the method further comprises validating a received QoS rule only if it is in the set of accepted QoS rules.

10. A policy and charging rules node (PCRN) comprising:

a roaming agreement storage configured to store at least one roaming agreement associated with at least one roaming partner;

a first interface configured to receive a session establishment request for a roaming subscriber;

a roaming manager configured to identify a roaming partner associated with the roaming subscriber and configured to identify a roaming agreement associated with the roaming partner; and a second interface configured to communicate session information with a roaming partner PCRN, wherein the at least one roaming agreement includes a session limit that includes at least one of: a number of sessions with the roaming partner PCRN, a number of subsessions per session with the roaming partner PCRN, and a total number of subsessions with the roaming partner PCRN.

11. The PCRN of claim 10, wherein the roaming manager is further configured to deny the session establishment request if an additional session would exceed the session limit of the selected roaming agreement.

12. The PCRN of claim 11, wherein the at least one roaming agreement includes a set of rules, wherein the PCRN further comprises a rule validator configured to validate a rule received from the roaming partner PCRN by comparing the received rule with the set of rules.

13. The PCRN of claim 12, wherein the rule validator is configured to send the roaming partner PCRN a valid rule from the set of rules if the rule validator determines that the received rule is not valid.

14. A tangible and non-transitory machine-readable storage medium encoded with instructions thereon for execution by a network element of a telecommunication network, wherein said tangible and non-transitory machine-readable storage medium comprises:

instructions for defining a roaming agreement associated with at least one roaming partner profile, the roaming agreement including at least one limitation on an S9 session between the PCRN and the roaming partner;

instructions for receiving a session establishment request at the PCRN;

instructions for extracting a subscription identifier from the session establishment request;

instructions for determining an active roaming partner by comparing the subscription identifier to the at least one roaming partner profile;

instructions for selecting the roaming agreement including the active roaming partner; and instructions for enforcing the at least one limitation of the roaming agreement when processing the session establishment request.

15. The tangible and non-transitory machine-readable storage medium of claim 14, wherein a roaming partner profile includes a set of 3GPP Networks defined by a Mobile Country Code (MCC) and Mobile Network Code (MNC).

16. The tangible and non-transitory machine-readable storage medium of claim 14, wherein a roaming partner profile includes a set of domain names.

17. The tangible and non-transitory machine-readable storage medium of claim 14, wherein the roaming agreement includes a plurality of roaming partner profiles.

18. The tangible and non-transitory machine-readable storage medium of claim 14, wherein the instructions for enforcing the at least one limitation of the roaming agreement comprise instructions for restricting at least one of: a number of sessions with a roaming partner PCRN, a number of subsessions per session with a roaming partner PCRN, and a total number of subsessions with a roaming partner PCRN.

19. The tangible and non-transitory machine-readable storage medium of claim 14, further comprising:

instructions for establishing a session or a subsession with a PCRN of the active roaming partner; and instructions for receiving a set of PCC rules from the PCRN of the active roaming partner.

20. The tangible and non-transitory machine-readable storage medium of claim 19, wherein the roaming agreement includes a set of PCC rules and the instructions for enforcing the roaming agreement further comprise instructions for validating a received PCC rule only if it is in the set of PCC rules.

21. The tangible and non-transitory machine-readable storage medium of claim 14, further comprising:

instructions for establishing a session or a subsession with a PCRN of the active roaming partner; and instructions for receiving a set of QoS rules from the PCRN.

22. The tangible and non-transitory machine-readable storage medium of claim 21, wherein the roaming agreement includes a set of QoS rules and the instructions for enforcing the roaming agreement further comprise instructions for validating a received QoS rule only if it is in the set of QoS rules.

23. The method of claim 1 wherein, the at least one limitation on an S9 session between the PCRN and the roaming partner limits the total number of subscribers of the roaming partner allowed to establish a roaming connection with the PCRN.

* * * * *